United States Patent [19]
Thoma et al.

[11] Patent Number: 5,177,141
[45] Date of Patent: Jan. 5, 1993

[54] COATING MATERIALS CONTAINING PUR DISPERSIONS AND SOLVENTS AND THEIR USE FOR THE PREPARATION OF WATER VAPOR PERMEABLE PUR COATINGS

[75] Inventors: Wilhelm Thoma; Rolf Langel; Walter Schröer, all of Leverkusen, Fed. Rep. of Germany

[73] Assignee: Bayer Aktiengesellschaft, Leverkusen, Fed. Rep. of Germany

[21] Appl. No.: 422,278

[22] Filed: Oct. 16, 1989

[30] Foreign Application Priority Data

Oct. 22, 1988 [DE] Fed. Rep. of Germany ....... 3836030

[51] Int. Cl.⁵ ............................ C08J 3/05; C08K 3/20
[52] U.S. Cl. .................................... 524/591; 524/839; 524/45
[58] Field of Search .................. 524/591, 839, 45

[56] References Cited

U.S. PATENT DOCUMENTS

| 3,666,542 | 5/1972 | Kigane et al. | 521/114 |
| 3,907,737 | 9/1975 | Marx et al. | 524/45 |
| 4,992,507 | 2/1991 | Coogan et al. | 524/591 |

FOREIGN PATENT DOCUMENTS

| 1694059 | 2/1974 | Fed. Rep. of Germany |
| 3610200 | 1/1987 | Fed. Rep. of Germany |
| 1145200 | 6/1967 | United Kingdom |
| 1210504 | 10/1970 | United Kingdom |
| 1248656 | 10/1971 | United Kingdom |

Primary Examiner—John Kight, III
Assistant Examiner—Duc Truong
Attorney, Agent, or Firm—Joseph C. Gil; Thomas W. Roy

[57] ABSTRACT

The present invention is directed to coating compositions (pastes) containing a) about 20 to 90% of an aqueous polyurethane dispersion which has a solids content of about 20 to 60% and wherein the polyurethane is rendered hydrophilic by carboxylate groups, sulphonate groups, pendant polyether chains having oxyethylene units, terminal polyether chains having oxyethylene units or mixtures thereof, b) about 0.1 to 5% by weight of a water-soluble, polymeric thickening agent for aqueous polyurethane dispersions which is not a polyurethane and which is free from carboxyl groups, c) about 3 to 80% by weight of water-immiscible organic solvent which is not a solvent for polyurethanes dispersed in water and which has a boiling point up to 250 C., d) about 0.1 to 5% by weight of a cross-linking agent for the polyurethane dispersed in water which does not contain free isocyanate groups and e) about 0.1 to 5% by weight of a hydrophilic polyisocyanate which promotes the adhesion of the coating composition to substrates and is a cross-linking agent for the polyurethane dispersed in water, the sum of the percentages of a)+b)+c)+d)+e) being 100.

The present invention is also directed to the use of these coating compositions for coating of substrates, preferably made of textile or leather, by the direct or transfer process, using the evaporation coagulation technique.

15 Claims, No Drawings

COATING MATERIALS CONTAINING PUR DISPERSIONS AND SOLVENTS AND THEIR USE FOR THE PREPARATION OF WATER VAPOR PERMEABLE PUR COATINGS

BACKGROUND OF THE INVENTION

1. Field of the Invention

The present invention is directed to coating materials (pastes) containing PUR dispersions and solvents and to their use for the preparation of water vapor permeable ("microporous") PUR coatings, preferably on textile or leather substrates by the direct or transfer process using the principle of coagulation by evaporation.

2. Description of the Prior Art

Coatings, in particular textile or leather coatings, which have a high permeability for water vapor and are also highly waterproof are of increasing interest, in particular in the clothing and shoe industries.

The advantages of these coatings is that clothing produced therefrom provides optimum protection from water and, in addition, allows body moisture to escape in the form of water vapor. These properties are of great importance not only in terms of health and hygiene but also with respect to wearing comfort.

An important process for preparing microporous, water vapor permeable clothing is the bath coagulation process, which is described, for example, in DE-AS (German Published Specification) 1,270,276 and DE-AS (German Published Specification) 1,769,277. In this process, a substrate is coated with a polyurethane or polyurethane urea dissolved in an organic solvent and the coated product is introduced into a bath containing a non-solvent (for example water) which is miscible with the solvent. The coagulation of the polyurethane takes place by extraction of the solvent by the non-solvent.

The disadvantages of this process are that very large amounts of non-solvent are required for the necessary complete removal of the solvent and that the process is lengthy. Moreover, special, relatively expensive apparatus is necessary for carrying out this process and also for working up the resulting solvent/non-solvent mixtures.

There has not, therefore, been a lack of attempts to prepare water vapor permeable coatings on conventional textile coating machines. The majority of these attempts use the method of so-called coagulation by evaporation. In principle this process is carried out by dissolving the polymer in a volatile solvent, then adding a specific amount of a less volatile non-solvent and coating a substrate with the solution, dispersion or suspension thus formed. The coating is dried by gentle heating, during which the volatile solvent preferably evaporates first. The result is that the polymer coagulates and, after a final drying process, has a microporous structure.

This procedure has been described, for example, in German Patent Specification 1,694,059; the polyurethanes are dissolved in volatile solvents such as tetrahydrofuran or methyl ethyl ketone and then mixed with organic non-solvents having a higher evaporation number, for example petroleum spirits (80°-110° C.).

A similar procedure has been described in Swiss Patent Specification 481,971 which also discloses water as a non-solvent which may be added to the polymer solutions. A further example of this process is the process according to German Patent Specification 2,004,276. In this process, the hydrophilic polyurethanes are based on aromatic diisocyanates and also contain certain percentages of polyoxyethylene compounds as structural components. Solutions of these polyurethanes in certain organic solvents such as methyl ethyl ketone are mixed with water as the non-solvent and applied to a substrate. The coating is then coagulated by selective evaporation and dried.

However, the processes mentioned which operate by the principle of evaporation coagulation still have shortcomings. A substantial disadvantage is that the selective evaporation of the more volatile solvent requires accurate temperature control. The handling of the respective products in the coating machines is therefore complicated and only possible at a relatively low operating speed. A more serious disadvantage, especially with the process disclosed in German Patent Specification 2,004,276, is based on the difficulties processing the polyurethane solutions or suspensions. Although the solids content is low, these products are highly viscous, even before the addition of water which takes place only at the time of application. The products are described as "slurry-like suspensions," and have a high tendency to dry prematurely with the formation of gel particles and specks. They are therefore difficult to handle by the coating machine. In addition, the coatings according to this patent specification have the disadvantage of insufficient light fastness.

It is further known from DE-OS (German Published Specification) 3,610,200 that aqueous dispersions of PUR plastics which carry carboxyl and/or sulphonate groups together with non-polyurethane resins containing pendant and/or terminal carboxyl groups as thickeners (which require ammonia to display their thickening action) and self-crosslinking polysiloxanes and water-immiscible solvents having boiling points of less than 170° C. provide stable pastes, which can be processed on conventional coating machines to give microporous coatings.

SUMMARY OF THE INVENTION

The present invention is directed to coating compositions (pastes) containing
  a) about 20 to 90% of an aqueous polyurethane dispersion which has a solids content of about 20 to 60% and wherein the polyurethane is rendered hydrophilic by carboxylate groups, sulphonate groups, pendant polyether chains having oxyethylene units, terminal polyether chains having oxyethylene units or mixtures thereof,
  b) about 0.1 to 5% by weight of a water-soluble, polymeric thickening agent for aqueous polyurethane dispersions which is not a polyurethane and which is free from carboxyl groups,
  c) about 3 to 80% by weight of water-immiscible organic solvent which is not a solvent for polyurethane dispersed in water and which has a boiling point up to 250° C.,
  d) about 0.1 to 5% by weight of a cross-linking agent for the polyurethane dispersed in water which does not contain free isocyanate groups and
  e) about 0.1 to 5% by weight of a hydrophilic polyisocyanate which promotes the adhesion of the coating composition to substrates and is a cross-linking agent for the polyurethane dispersed in water, the sum of the percentages of a)+b)+c)+d)+e) being 100.

The present invention is also directed to the use of these coating compositions for coating of substrates, preferably made of textile or leather, by the direct or transfer process, using the evaporation coagulation technique.

DETAILED DESCRIPTION OF THE INVENTION

In accordance with the present invention the term polyurethane(s) (PUR) is also understood to include polyurethane ureas. This definition also applies when this term appears in word combinations.

The coating compositions preferably contain about 40 to 70% by weight of a). The aqueous dispersions of PUR which are used as component a) preferably have a solids content of about about 35 to 45% by weight. The coating compositions preferably contain about 25 to 70% by weight of c) and/or about 1 to 3% by weight of e). The coating compositions preferably have viscosities of about 5,000 to 40,000 mPa·s/25° C.

Surprisingly, the coating materials according to the invention have good stability, good handling and good coating properties (air- and also knife-roll coater) and can advantageously be used without difficulties for the preparation of microporous coatings having good substrate adhesion.

The use of thickeners which are free from carboxyl groups (which make the use of ammonia unnecessary) results in a significant improvement in adhesion, for example, of the base coat to the substrate and also of the subsequent coat to the base coat when compared with the procedure from DE-OS (German Published Specification) 3,610,200). The improvement in adhesive strength is of the utmost importance for the performance characteristics of coated articles such as dry cleaning, washability and the Scrubb test in the dry state and in particular in the wet state.

Furthermore, the use of the coating compositions according to the invention is distinguished by a uniform formation of pores by the evaporation coagulation process, which leads to a high water vapor permeability of the microporous layers of 5 to 10 mg/cm$^2$·h according to IUP 15 (DIN 53 333).

The pastes are preferably preferred by a process wherein the dispersions of the polyurethanes or polyurethane ureas are thickened in water by the addition of the water-soluble, polymeric nonpolyurethanes, the water-immiscible organic solvents are then incorporated and finally the crosslinking agents and, if desired, further coating auxiliaries and additives may be added.

It is particularly advantageous to initially disperse the water-immiscible solvent (mixture) in the PUR dispersion. A mixture of thickener, non-isocyanate crosslinking agent and, if desired, coating assistants and additives is then added before the water-compatible polyisocyanate is stirred into the thickened formulation.

The PUR dispersions a) are prepared in known manner from known components such as high molecular weight polyhydroxyl compounds, polyisocyanates and chain-lengthening agents. The polyhydroxyl compounds preferably have molecular weights of 400 to 8,000, preferably about 600 to 5,000, as determined by end group analysis. They include divalent and polyvalent hydroxypolyesters, hydroxypolylactones, hydroxypolycarbonates, hydroxypolacetals, or their mixed condensates or mixtures. The polyisocyanates used can be divalent or polyvalent aliphatic, cycloaliphatic, aromatic or heterocyclic polyisocyanates, preferably diisocyanates; aliphatic, cycloaliphatic and aromatic diisocyanates are preferred.

Examples of suitable chain lengthening agents include dialcohols, amino alcohols, diamines (or their bisketimines) and hydrazine hydrate (or its ketazines). The incorporation of carboxylate groups, sulphonate groups and/or polyether chains having oxyethylene units is effected by the use of the appropriate compounds containing these groups or units. Examples of these compounds include monofunctional or polyfunctional polyethers containing oxyethylene groups, dimethylol-propionic acid, ethylenediamine-N-acetic acid, ethylenediamine-N-propionic acid, the alkali metal salts of the acids mentioned, polyamines containing sulphonate groups (such as diamines modified by ethylene sulphone, propylene sulphone or butane sulphone) and sulphonate diols such as those disclosed in DE-OS (German Published Specification) 2,410,862 and U.S. Pat. No. 4,108,814, herein incorporated by reference.

Preparation processes and (further) suitable starting components for the polyurethanes used in a) are known, for example, from the following literature references: DE-AS (German Published Specification) 1,097,678, German Patent Specification 1,184,946, German Patent Specification 1,178,586 (U.S. Pat. No. 3,756,912), DE-OS (German Published Specification) 1,237,306, DE-OS (German Published Specification) 1,495,745, DE-OS (German Published Specification) 1,595,602, DE-OS (German Published Specification) 1,770,068, DE-OS (German Published Specification) 1,913,271, DE-OS (German Published Specification) 2,019,324, DE-OS Published Specification) 2,314,512, (U.S. Pat. No. 3,905,329, herein incorporated by reference), DE-OS (German Published Specification) 2,811,148, DE-OS (German Published Specification) 2,320,719 (UK Patent Specification 1,465,572), DE-OS (German Published Specification) 2,446,440, DE-OS (German Published Specification) 2,555,534, DE-OS (German Published Specification) 2,725,589, DE-OS (German Published Specification) 2,732,131, U.S. Pat. No. 4,192,937 (herein incorporated by reference) and also the corresponding publications, for example D. Dieterich et al, Agnew. Chem. 82, 53 (1970), Angew, Makromol. Chem. 76, 85 (1972) and 98, 133–165 (1981) and Progress in Organic Coatings 9, 281–341 (1981) and the literature references mentioned therein. It is also possible to use OH-containing dispersions, such as have been described in EP-A-122,552 on pages 6 to 14. Finally, reference is made to U.S. Pat. No. 4,408,008, which is herein incorporated by reference.

Preferably, the polyurethanes used in a) are prepared from polyhydroxy compounds having a molecular weight about 600 to 5,000; aliphatic, cycloaliphatic and/or aromatic polyisocyanates, in particular diisocyanates; polyalcohols and/or polyamines having a molecular weight 62 to 400 as chain lengthening agents. A portion of these chain lengthening agents may have at least one carboxylate and/or sulphonate group and/or a polyether chain containing oxyethylene units. Especially preferred polyurethanes are prepared from about 1.2 to 5 moles of polyisocyanates and about 0.1 to 4 moles of chain lengthening agents per mole of polyhydroxy compounds wherein about 0.01 to 4 moles of these chain lengthening agents have at least one carboxylate group, sulphonate group and/or polyether chain containing oxyethylene units.

Water-soluble, polymeric thickening agents b) which are not polyurethanes and are free from carboxyl groups are preferably polyvinylpyrrolidone and/or copolymers thereof (in particular with alkyl (meth)acrylates) and/or polyalkylene glycols having molecular weights of about 10,000 to 500,000, preferably about 30,000 to 100,000, preferably polyethylene glycols.

The solvents which serve as water-immiscible solvents according to c) have boiling points of up to about 250° C., preferably up to about 220° C., more preferably about 170°-220° C. Examples of these solvents include aliphatic and/or aromatic hydrocarbons such as petroleum fractions or mixtures of aromatic hydrocarbons of $C_9$-$C_{11}$ products (e.g., Solvesso 100, Exxon), toluene, xylene, mesitylene, durene, ethylbenzene and mixtures thereof; lower fatty acid esters such as ethyl acetate, butyl acetates, amyl acetates, ethoxyglycol acetate, methoxypropyl acetate, ethyl propionate, butyl butyrates and mixtures thereof or mixtures with the hydrocarbons mentioned; aliphatic and cycloaliphatic ketones such as methyl isobutyl ketone, ethyl butyl ketone, dibutyl ketone, cyclohexanone and mixtures thereof or mixtures with the hydrocarbons and/or esters mentioned.

Crosslinking agents which are suitable for use as component d) include urea/formaldehyde and melamine/formaldehyde resins, polyaziridines, polyepoxides, blocked polyisocyanates and polycarbodiimides. Examples include urea/methylol and melamine/methylol resins which may be completely or partially, preferably predominantly, etherified with methanol or butanols such as melamine/hexamethylol ether or those available as formulated commercial products from Hoechst AG under the name Maprenal MF 900, 910, 915, 920, 927, 800, 650, 700 and 750 or Cassurit HML; polyisocyanates which have been reacted with ethyleneimine or propyleneimine; aziridine ureas as disclosed, e.g., in German Patent Specification 1,152,161; reaction products of acrylate esters of polyvalent alcohols and ethyleneimine and/or propyleneimine such as the reaction product of trimethylolproane triacrylate with propylenimine; polyepoxides prepared from bisphenol A and epichlorohydrin or polyalcohols and epichlorohydrin; polycarbodiimides based on toluylene diisocyanate; and polyisocyanates blocked with butanone oxime or malonic ester as described in DE-OS (German Published Specification) 3,313,236, in particular Example 4.

Water-compatible polyisocyanates according to e), which serve as adhesion promoters and additional cross-linking agents include hydrophilic polyisocyanates, preferably those prepared from aliphatic and/or cycloaliphatic polyisocyanates such as hexane diisocyanate, isophorone diisocyanate or isocyanurate and biuret polyisocyanates based on these diisocyanates. The polyisocyanates are rendered hydrophilic by a reaction with EOx/POx polyethers (polyethylene glycols/polypropylene glycols), whose EOx content is at least 50%, preferably more than 70% by weight. The NCO content of these hydrophilic polyisocyanates is preferably about 5 to 30%, more preferably about 15 to 25% by weight.

The pastes may also contain coating auxiliaries and additives such as pigments, fillers, hydrophobizing agents (e.g. fluorohydrocarbons), light and hydrolysis stabilizers, antioxidants, flameproofing agents, antistatics, flow-improving agents (e.g. silicones), antifoaming agents, handle-improving agents, fungicides and bactericides and other known additives.

The invention is further illustrated but is not intended to be limited by the following examples in which all parts and percentages are by weight unless otherwise specified.

EXAMPLES

Example 1

1.1 Preparation of a PUR dispersion

A dried mixture of 1,680 g of a polytetramethylene glycol polyether (OH Number 56) and 21.4 g of dimethylolpropionic acid was mixed at 60° C. with 297 g of 1,6-hexane diisocyanate and reacted at 100° C. until the NCO content of the NCO prepolymer was 3.0%. This prepolymer was dissolved in 3,600 g of acetone with cooling.

An aqueous solution of 9.8 g of hydrazine hydrate and 49.6 g of sodium ethylenediamine-$\beta$-ethylsulphonate in 500 g of water was added dropwise to the acetone solution of the prepolymer. After stirring in a further 2,700 g of water, the acetone was distilled off in vacuo to provide an aqueous dispersion containing about 40% of PUR solid.

1.2 Preparation of the base coat paste 625 g of the PUR dispersion (1.1) were stirred with 375 g of a hydrocarbon mixture (kerosene, boiling range 160° to 250° C.). 20 g of a polyvinylpyrrolidone solution (30% solids in water; ®Collacral VL, BASF), 20 g of a 30% solids aqueous-acetone containing dispersion of a fluoroalkyl acrylate copolymer (Xeroderm WF; Bayer AG), 10 g of a melamine resin (50% solids in water; ®Acrafix MF, Bayer AG) and 30 g of a hydrophilic polyisocyanate having an NCO content of about 20% (reaction product of a biuret polyisocyanate based on 1,6-hexane diisocyanate with polyethylene glycol, OH number about 112) were stirred into this FUR water/kerosene dispersion.

The viscosity of the paste was about 10,000 mPa.s at 25° C. at a total solids concentration of about 27%.

1.3 Preparation of the top coat paste

As in 1.2, 20 g of a polyvinylpyrrolidone solution (®Collacral VL, BASF), 20 g of a 30% solids, aqueous acetone-containing dispersion of a fluoroalkyl acrylate copolymer (Xeroderm WF, BAYER AG), 10 g of a melamine resin (50% solids in water; ®Acrafix MF, Bayer AG) and 10 g of a hydrophilic polyisocyanate having an NCO content of about 20% (reaction product of a biuret polyisocyanate based on 1,6-hexane diisocyanate with polyethylene glycol, OH number about 112) were stirred into 1000 g of the PUR water/kerosene dispersion described in 1.2. In addition, 10 g of a 50% solids solution of a polydimethylsiloxane (molecular weight about 50,000) in toluene were also added.

Viscosity: about 8,000 mPa.s/25° C.
Concentration: about 26%.

1.4 Direct coating of PA fabric a) PA taffeta (having a weight of about 80 g/m$^2$) was coated with base coat paste 1.2 by means of an air knife. Tunnel temperature for drying and condensation 80°/120°/160° C., weight of coating—10 g of solids/m$^2$.

A second coat was applied using top coat paste 1.3 by means of a roller-coating knife (knife gap 0.35 mm) and dried and condensed analogously to the base coat. Total weight of coating: 50 g/m$^2$. The soft, microporous coating is permeable to water vapor and waterproof.

| | |
|---|---|
| WDD according to DIN 53.333 | 8 mg/cm² · h |
| Waterproofness (water column) | 1,000 mm |
| Scrubb test (1,000 strokes) dry/wet | without damage | b) A further coat was applied to coating 1.4a using paste 1.3 by means of a roller-coating knife: total weight of coating: 70 g of solid/m².

| | |
|---|---|
| WDD according to DIN 53.333 | 7 mg/cm² · h |
| Waterproofness (water column) | 1,500 mm |
| Scrubb test (1,000 strokes) dry/wet | without damage |

The soft, supple coated article was impermeable to liquid water and permeable to water vapor; it was crack-resistant at room temperature and also at low temperatures of −30° to −40° C.

Even after several washes and dry cleaning, the article was waterproof and permeable to vapor.

Example 2

2.1 Preparation of the PUR dispersion

A dried mixture of 1,675 g of a polyester from hexanediol, neopentyl glycol (molar ratio of diols 65:35) and adipic acid (OH number 66) and 65 g of a monofunctional EOX/POX polyether started with n-butanol and having an EOX/POX ratio of 85:15 and a molecular weight of 2,000 was mixed at 60° C. with 185 g of 1,6-hexane diisocyanate and 244 g of isophorone diisocyanate. The mixture was then heated to 100° C. until an NCO content of about 4.5% had been obtained. The prepolymer was then dissolved in 4,000 g of acetone and a solution of 102 g of isophoronediamine and 23 g of sodium ethylenediamine-β-ethylsulphonate in 300 g of water was added dropwise to the acetone solution. After stirring in a further 3,500 g of water, the acetone was distilled off in vacuo to provide an aqueous dispersion having about 40% PUR solids.

2.2 Preparation of the base coat paste 600 g of PUR dispersion 2.1 was stirred with 400 g of Sangajol (hydrocarbon mixture having a boiling range 140° to 200° C., Shell). 20 g of polyvinylpyrrolidone solution (30% solids in water ®Collacral VL, BASF), 20 g of a 30% solids, aqueous acetone-containing dispersion of a fluoroalkyl acrylate copolymer (Xeroderm WF, Bayer AG), 20 g of a polycarbodiimide (50% strength in NMP ®Bayderm Fix PCL, Bayer AG) and 30 g of the hydrophilic polyisocyanate used in Example 1.2 were incorporated into this formulation.

Viscosity: about 10,000 mPa.s/25° C.
Concentration: about 27%.

2.3 Preparation of the paste/top coat A) based on a dispersion 10 g of a 50% solids solution to a polydimethylsiloxane (molecular weight about 50,000) in toluene were added to 1,090 g of base coat past 2.2.

Viscosity: about 9,000 mPa.s/25° C.
Concentration: about 27%.

2.4 Preparation of the paste/top coat B) based on a solution

Example 5/II of U.S. Pat. No. 4,743,470. DE-OS (German Published Specification) 3,522,464.

2.5 Direct coating of PES fabric a) A PES fabric having a weight of about 110 g/cm² was coated with base coat past 2.2 by means of a roller-coating knife, 0.2 mm gap. Drying and crosslinking took place at 80°/120°/160° C.; total weight of coating: 20 g of solid/m².

The second coat was applied by means of top coat paste A according to 2.3 also using a roller-coating knife and was dried and condensed analogously to the base coat. Gap 0.3 mm. Total weight of coating: about 45 g/m².

| | |
|---|---|
| WDD according to DIN 53.333 | 8 mg/cm² · h |
| Waterproofness (water column) | 1,500 mm |
| Scrubb test (1,000 strokes) dry/wet | without damage | b) A second coat was applied to the PES fabric primed with base coat paste 2.2 using top coat paste B according to 2.4 by means of a roller-coating knife. Knife gap 0.25 mm, drying and condensation 60°/60°/160° C., total weight of coating: about 40 g of solids/m².

| | |
|---|---|
| WDD according to DIN 53.333 | 8 mg/cm² · h |
| Waterproofness (water column) | 2,000 mm |
| Scrubb test (1,000 strokes) dry/wet | without damage |

The articles produced according to 2.5a) and 2.5b) were distinguished, in addition to high waterproofness and high permeability to water vapor, by a full handle and, according to 2.5a), by a particularly dry surface having good frictional properties.

Example 3

3.1 Preparation of the PUR dispersion 850 g of a polyester carbonate having an OH number of 56 and prepared from ω-hydroxyhexyl-ω'-hydroxycaproic acid and diphenyl carbonate, 400 g of a polyester having an OH number of 56 and prepared from hexanediol/neopentyl glycol (molar ratio of glycols of 65:35) and adipic acid, 18 g of 1,4-butanediol, 60 g of a monofunctional EOX/POX polyether (see 2.1) and 21.5 g of dimethylolpropionic acid were dried and mixed at 60° C. with 400 g of isophorone diisocyanate. The mixture was then heated to 80° C. for 2 hours. After cooling, the polymer was dissolved in 2,800 g of acetone. A solution of 12 g of ethylenediamine, 7.5 g of hydrazine hydrate and 25 g of sodium ethylenediamine-β-ethylsulphonate in 500 g of water was then added dropwise at 25° C. over a period of 45 minutes to the acetone solution. After the addition of 1,675 g of water, the acetone was distilled off in vacuo. The aqueous PUR dispersion had a solids content of about 45%.

3.2 Preparation of the base coat paste 550 g of PUR dispersion 3.1 were stirred with 450 g of Terapin (hydrocarbon mixture having a boiling range of 155° to 185° C., Shell). 30 g of polyethylene glycol solution (18% solids in water, isopropanol; Verdicker A, Bayer AG), 20 g of a 30% solids, aqueous acetone-containing dispersion of a fluoroalkyl acrylate copolymer (Xeroderm WF, Bayer AG), 20 g of a polyaziridine (prepared from 1 mole of pentaerythritol, 3 moles of acrylic acid and 3 moles of ethyleneimine) and 30 g of a hydrophilic polyisocyanate having an NCO content okf about 20% (see 1.2) were incorporated into this aqueous-organic formulation.

Viscosity: 7.000 mPa.s/25° C.
Concentration: about 28%.

3.3 Preparation of the top coat paste 20 g of a 50% strength solution of a polydiemthylsiloxane (molecular weight about 50,000) in toluene were added to 1,100 g of base coat paste 3.2.

Viscosity: about 6,500 mPa.s/25° C.
Concentration: about 28.7%.

3.4 Direct coating of hydrophobized cotton

The hydrophobized fabric was coated with base coat 3.2 by means of an air knife and dried and condensed at 80°/120°/160° C.; weight of coating: 10 g of solid/m$^2$. The second coat (top coat paste 3.3) was applied by means of a roller-coating knife and dried and condensed analogously.

Total weight of coating: 35 g of solids/m$^2$.
WDD according to DIN 53.333 7 mg/cm$^2$·h.
Waterproofness (water column) 2,000 mm.
Scrub test (1,000 strokes), dry/wet, without damage.

The coated article was distinguished by a particularly elegant, dry handle. The waterproofness and permeability to water vapor of the coating were maintained after washing and dry cleaning.

Example 4

4.1 Preparation of the PUR dispersion 900 g of a polycarbonate having an OH number 56 and prepared from nonanediol and diphenyl carbonate, 300 g of polytetramethylene glycol ether (OH number 56), 18 g of 1,4-butanediol, 25 g of dimethylolpropionic acid, 60 g of a monofunctional EOX/POX polyether on n-butanol (see example 2.1) were dried and mixed with 302 g of 1,6-hexane diisocyanate at 60° C. and heated to 80° C. for 2½ hours.

After cooling, the NCO prepolymer was dissolved in 2,800 g of acetone. A solution of 18 g of ethylenediamine and 15 g of hydrazine hydrate in 500 g of water was added dropwise to this solution at 25° to 30° C. over a period of about 45 minutes. After the addition of 1,960 g of water, the acetone was distilled off in vacuo. The aqueous PUR dispersion has solids content of about 40%.

4.2 Preparation of the top coat paste (transfer coating)

625 g of PUR dispersion 4.1 were stirred with 375 g of hydrocarbon mixture from Example 2.2. 25 g of polyvinylpyrrolidone solution (30% solids in water-/acetone 55:15 ®Collacral VL, BASF), 20 g of a melamine resin (50% solids in water; Acrafix MF, Bayer AG), 15 g of a 50% solids solution of polydimethylposiloxane (molecular weight about 50,000) in toluene and 30 g of a hydrophilic polyisocyanate (see 1.2) were incorporated into this PUR water/hydrocarbon dispersion. The viscosity of the paste was about 12,000 mPa.s/25° C.; total solids about 28%.

4.3 Transfer coating a) A water-proof release paper (Wiggins) Teape High Light 803 smooth) was coated with top coat past 4.2 by means of a roller-coating knife, gap 0.3 mm. Drying and condensation 80°/120°/160° C., weight of coating: 25 g of solids/m$^2$.

The paste according to 1.2 was applied as an adhesive coat by means of a knife, gap 0.35 mm. A cottonpolyester fabric (150 g/m$^2$) was then luminated onto the coated release paper and the material was dried and condensed as above to provide a soft, full, article permeable to water vapor and having a dry, nappa-like handle.

| WDD according to DIN 53.333 | 8 mg/cm$^2$·h |
| Waterproofness (water column) | 1.200 mm |
| Scrubb test (1,000 strokes) dry/wet | without damage | b) A compact precoat permeable to water vapor was applied to release paper, which was not waterproof, using the paste according to 4.4 by means of a roller-coating knife, weight of coating: 8 g of solids/m$^2$.

The top coat or intermediate coat was produced in the form of a microporous layer using paste 4.2. Drying and condensation 80°/120°/160°, weight of coating: 25 g of solid/m$^2$. The paste according to 1.2 served as adhesive coat to the substrate according to (4.3a) and the material was dried and condensed as above to provide a dry, full, water vapor permeable article of high waterproofness (water column greater than 2,500 mm) and good water vapor permeability (6 mg/cm$^2$·h).

4.4 Preparation of the precoat paste 1,120 g of a polyester from adipic acid, 1,6-hexanediol and neopentyl glycol (molar ratio of glycols 65:35) having an OH number of 56, 600 g of dihydroxypolyethylene glycol having an OH number of 56 and 84 g of α,ω-bishydroxymethylpolydimethylsiloxane having an OH number of 200 were dried and heated with 755 g of isophorone diisocyanate to 100° C. for 2 hours. The NCO prepolymer thus obtained was diluted with 3,460 g of toluene. A solution of 408 g of isophoronediamine in 3,460 g of isobutanol was added dropwise at 25° C. to this solution to provide a 30% solids solution of 2,500 mPa·s/25° C.

EXAMPLE 5

A conventionally retanned, fat liquored dyed and, after drying, buffed cowhide split leather freed from dust is coated as follows:

The polyurethane solution mentioned in 5.1 pigmented in a conventional manner with 15% of a commercially available pigment (BAYDERM Zitron BITO of BAYER AG) is applied by means of a roller-coating knife to a grained polyurethane release paper (for example High Light 803, from Wiggins Teape). The solid add-on is 25 g/m$^2$.

120 g/m$^2$ of the paste described in Example 2.2 was applied to the dry top coat. Drying was carried out at temperatures increasing from 60° to 80° to 100° C., depending upon the output of the oven, for 2 to 4 minutes. The 30% solids polyurethane solution described under 5.2 was applied as an adhesive coat by means of a knife to the resulting microporous layer. Wet weight of coating: about 90 g/m$^2$.

The split leather was placed without creases on the still wet adhesive coat and pressed down. Drying was carried out for 2 to 4 minutes at temperatures increasing from 70° to 120° C. After cooling, the water vapor permeable coated leather was pulled off the release paper.

The water vapor permeability of this coated leather was 3 mg/cm$^2$·h (DIN 53 333).

5.1 Preparation of the polyurethane solution 1,320 g of a polycarbonate (OH number 56; molecular weight: 2,000) prepared from diphenyl carbonate and a dihydroxy ester prepared from 1 mole of 1,6-hexanediol and 1 mole of caprolactone 400 g of a polyoxyethylene polyether initiated with ethylene glycol (OH number 56; molecular weight: about 2,000) and 84 g of a dimethylpolysiloxane having terminal hydroxymethyl groups (molecular weight: 600) were dehydrated with a water pump vacuum and reacted with 710.4 g of 3-isocyanatomethyl-3,5,5-trimethylcyclohexyl isocyanate (IPDI) at 100° C. for 1.5 hours. The resulting isocyanate prepolymer was dissolved in 3,370 g of toluene. 374 g of a 3-aminomethyl-3,3,5-trimethylcyclohexylamine (IPDA) were mixed with 3,370 g of i-butanol and slowly added to the prepolymer solution which was stirred at about 25°–30° C. The viscosity of this mixture increased towards the end of the reaction: the addition was stopped when the viscosity exceeded 15,000 mPa·s. The reaction was stopped by the addition of butanone oxime to provide a 30% solids polyurethane solution.

5.2 Preparation of the polyurethane solution for the adhesive coat

Analogously to the procedure of 5.1, a polyurethane urea was prepared from the following components:

1,000 g of a polycarbonate prepared from diphenyl carbonate and a dihydroxyl ester prepared from 1 mole of 1,6-hexanediol and 1 mole of caprolactome (OH number 56; molecular weight: 2,000)
1,000 g of a polyoxyethylene polyether initiated with ethylene glycol (OH number 56; molecular weight about 2,000)
732.6 g of isophorone diisocyanate
195.5 g of isophorone diamine
57.5 g of hydrazine hydrate
3,460 g of toluene and
3,460 g of i-butanol.

The viscosity of the 30% solids solution was about 20,000 mpa·s.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising
   a) about 20 to 90% of an aqueous polyurethane dispersion which has a solids content of about 20 to 60% and wherein the polyurethane is rendered hydrophilic by a substituent which comprises a member selected from the group consisting of carboxylate groups, sulphonate groups, pendant polyether chains having oxyethylene units, terminal polyether chains having oxyethylene units and mixtures thereof,
   b) about 0.1 to 5% by weight of a water-soluble, polymeric thickening agent for aqueous polyurethane dispersions which is not a polyurethane and which is free from carboxyl groups,
   c) about 3 to 80% by weight of water-immiscible organic solvent which is not a solvent for polyurethane dispersed in water and which has a boiling point up to 250° C.,
   d) about 0.1 to 5% by weight of a cross-linking agent for the polyurethane dispersed in water which does not contain free isocyanate groups and
   e) about 0.1 to 5% by weight of a hydrophilic polyisocyanate which promotes the adhesion of the coating composition to substrates and is a cross-linking agent for the polyurethane dispersed in water,
   wherein the sum of the percentages a)+b)+c)+d)+e) is 100, based on components a)–e)

2. The coating composition of claim 1 wherein said aqueous polyurethane dispersion a) has a solids content of about 35 to 45% by weight.

3. The coating composition of claim 1 which contains about 25% to 70% by weight of said water-immiscible organic solvent c).

4. The coating composition of claim 1 which contains about 1 to 3% by weight of said hydrophilic polyisocyanate e).

5. The coating composition of claim 1 which contains about 40 to 70% by weight of aqueous polyurethane dispersion a).

6. The coating composition of claim 1 wherein the water-soluble polymeric thickening agent b) comprises a member selected from the group consisting of polyvinylpyrrolidone polymers, copolymers based on polyvinylpyrrolidone and polyethylene glycols and mixtures thereof.

7. The coating composition of claim 1 wherein the the water-immiscible organic solvent c) has a boiling point of up to 220° C. and comprises a member selected from the group consisting of aromatic hydrocarbons, aliphatic hydrocarbons and mixtures thereof.

8. The coating composition of claim 1 wherein the cross-linking agent d) comprises a member selected from the group consisting of blocked polyisocyanates, urea resins, melamine resins, urea/melamine resins, polyepoxides, polyaziridines, polycarbodiimides and mixtures thereof.

9. The coating composition claim 1 wherein the hydrophilic polyisocyanate e) has an NCO content of about 5 to 30% by weight and is prepared by reacting a polyisocyanate containing alphabetically- and/or cycloaliphatically-bound isocyanate groups with an ethylene oxide/propylene oxide polyether having an ethylene oxide content of at least 50% by weight.

10. A coating composition comprising
    a) about 40 to 70% of an aqueous polyurethane dispersion which has a solids content of about 20 to 60% and wherein the polyurethane is rendered hydrophilic by a substituent which comprises a member selected from the group consisting of carboxylate groups, sulphonate groups, pendant polyether chains having oxyethylene units, terminal polyether chains having oxyethylene units and mixtures thereof,
    b) about 0.1 to 5% by weight of a water-soluble, polymeric thickening agent for aqueous polyurethane dispersions which is not a polyurethane, is free from carboxyl groups and comprises a member selected from the group consisting of polyvinylpyrrolidone polymers, copolymers based on polyvinylpyrrolidone and polyethylene glycols and mixtures thereof, c) about 25 to 70% by weight of water-immiscible organic solvent which is not a solvent for the polyurethane dispersed in water, has a boiling point up to 220° C. and comprises a member selected from the group consisting of aromatic hydrocarbons, aliphatic hydrocarbons and mixtures thereof, d) about 0.1 to 5% by weight of a cross-linking agent for the polyurethane dispersed in water which does not contain free isocyanate groups and comprises a member selected from the group consisting of blocked polyisocyanates, urea resins, melamine resins, urea/melamine resins, polyepoxides, polyaziridines, polycarbodiimides and mixtures thereof, and e) about 1 to 3% by weight of a hydrophilic polyisocyanate which promotes the adhesion of the coating composition to substrates, is a cross-linking agent for the polyurethane dispersed in water, has an NCO content of about 5 to 30% by weight and is prepared by reacting a polyisocyanate containing aliphatically- and/or cycloaliphatically-bound isocyanate groups with an ethylene oxide/propylene oxide polyether having an ethylene oxide content of at least 50% by weight, wherein the sum of the percentages a)+b)+c)+d)+e) is 100.

11. The coating composition of claim 10 wherein said aqueous polyurethane dispersion a) has a solids content of about 35 to 45% by weight.

12. The coating composition of claim 10 wherein the water-immiscible organic solvent c) comprises a petroleum fraction.

13. The coating composition of claim 10 wherein said polyisocyanate containing aliphatically- and/or cycloaliphatically-bound isocyanate groups comprises a polyisocyanate containing isocyanurate groups of biuret groups and said ethylene oxide/propylene oxide polyether has an ethylene oxide content of at least 70% by weight.

14. A water vapor permeable coated textile or leather substrate wherein the coating is based on a coating composition comprising a) about 20 to 90% of an aqueous polyurethane dispersion which has a solids content of about 20 to 60% and wherein the polyurethane is rendered hydrophilic by a substituent which comprises a member selected from the group consisting of carboxylate groups, sulphonate groups, pendant polyether chains having oxyethylene units, terminal polyether chains having oxyethylene units and mixtures thereof, b) about 0.1 to 5% by weight of a water-soluble, polymeric thickening agent for aqueous polyurethane dispersions which is not a polyurethane and which is free from carboxyl groups, c) about 3 to 80% by weight of water-immiscible organic solvent which is not a solvent for polyurethane dispersed in water and which has a boiling point up to 250° C., d) about 0.1 to 5% by weight of a cross-linking agent for the polyurethane dispersed in water which does not contain free isocyanate groups and e) about 0.1 to 5% of a hydrophilic polyisocyanate which promotes the adhesion of the coating composition to substrates and is a cross-linking agent for the polyurethane dispersed in water, wherein the sum of the percentages a)+b)+c)+d)+e) is 100.

15. The coated textile or leather substrate of claim 14 wherein the coating composition comprises a) about 40 to 70% of an aqueous polyurethane dispersion which has a solids content of about 20 to 60% and wherein the polyurethane is rendered hydrophilic by a substituent which comprises a member selected from the group consisting of carboxylate groups, sulphonate groups, pendant polyether chains having oxyethylene units, terminal polyether chains having oxyethylene units and mixtures thereof, b) about 0.1 to 5% by weight of a water-soluble, polymeric thickening agent for aqueous polyurethane dispersions which is not a polyurethane, is free from carboxyl groups and comprises a member selected from the group consisting of polyvinylpyrrolidone polymers, copolymers based on polyvinylpyrrolidone, polyethylene glycols and mixtures thereof, c) about 25 to 75% by weight of water-immiscible organic solvent which is not a solvent for the polyurethane dispersed in water, has a boiling point up to 220° C. and comprises a member selected from the group consisting of aromatic hydrocarbons, aliphatic hydrocarbons and mixtures thereof, d) about 0.1 to 5% by weight of a cross-linking agent for the polyurethane dispersed in water which does not contain free isocyanate groups and comprises a member selected from the group consisting of blocked polyisocyanates, urea resins, melamine resins, urea/melamine resins, polyepoxides, polyazirdines, polycarbodiimides and mixtures thereof, and e) about 1 to 3% by weight of a hydrophilic polyisocyanate which promotes the adhesion of the coating composition to substrates, is a cross-linking agent for the polyurethane dispersed in water, has an NCO content of about 5 to 30% by weight and is prepared by reacting a polyisocyanate containing aliphatically- and/or cycloaliphatically-bound isocyanate groups with an ethylene oxide/propylene oxide polyether having an ethylene oxide content of at least 50% by weight.

* * * * *